United States Patent
Wang et al.

(10) Patent No.: US 6,816,177 B2
(45) Date of Patent: Nov. 9, 2004

(54) DISPLAY OBSERVATION ANGLE OF WHICH IS MULTIDIRECTIONALLY ADJUSTABLE

(76) Inventors: Tony Wang, 8F, No. 173, Sec. 2 Ta-Tung Rd., Hsichih City Taipei County (TW); Kuo-Hua Tsai, 3F, No. 54, Lane 116, Sec. 6, Yen-Ping N. Rd., Taipei (TW); Shih-Ho Huang, 33F, No. 170, Ching-Ping Rd., Chungho City, Taipei County (TW)

( * ) Notice: Subject to any disclaimer, the term of this patent is extended or adjusted under 35 U.S.C. 154(b) by 329 days.

(21) Appl. No.: 10/055,906

(22) Filed: Jan. 28, 2002

(65) Prior Publication Data

US 2003/0142064 A1 Jul. 31, 2003

(51) Int. Cl.⁷ .............................. G06F 1/16; H04N 5/64; A47B 81/06; A47B 88/00
(52) U.S. Cl. ....................... 345/905; 361/681; 348/836; 348/837; 312/7.2; 312/319.6
(58) Field of Search ................................. 345/156, 905; 340/487; 312/7.2, 319.6; 348/836, 837; 361/681

(56) References Cited

U.S. PATENT DOCUMENTS

| | | | | |
|---|---|---|---|---|
| 4,983,951 A | * | 1/1991 | Igarashi et al. | 340/461 |
| 5,161,028 A | * | 11/1992 | Kawata et al. | 348/837 |
| 5,173,686 A | * | 12/1992 | Fujihara | 345/87 |
| 5,388,032 A | * | 2/1995 | Gill et al. | 700/17 |
| 5,847,685 A | * | 12/1998 | Otsuki | 345/87 |
| 5,917,435 A | * | 6/1999 | Kamiya et al. | 340/995.26 |
| 6,011,685 A | * | 1/2000 | Otsuki | 361/679 |
| 6,012,785 A | * | 1/2000 | Kawasaki | 312/29 |
| 6,142,590 A | * | 11/2000 | Harwell | 312/223.1 |
| 6,144,549 A | * | 11/2000 | Moss et al. | 361/681 |
| 6,168,250 B1 | * | 1/2001 | Rogov | 312/294 |
| 6,219,323 B1 | * | 4/2001 | Fukatsu et al. | 369/75.1 |
| 6,373,213 B1 | * | 4/2002 | Watanabe et al. | 318/445 |
| 6,476,879 B1 | * | 11/2002 | Ho et al. | 348/837 |
| 6,570,628 B1 | * | 5/2003 | Hirano | 349/11 |
| 6,636,426 B2 | * | 10/2003 | Inman | 361/724 |

* cited by examiner

*Primary Examiner*—Amare Mengstu
*Assistant Examiner*—Jeff Piziali
(74) *Attorney, Agent, or Firm*—Troxell Law Office PLLC

(57) ABSTRACT

Display observation angle of which is multidirectionally adjustable, including a panel control system, a panel, a transmission mechanism and a housing receiving the above components. The panel control system includes a program processing unit for turning on/off the transmission mechanism, a command input unit for giving control signal to the program processing unit and a mechanical position detection unit for always sensing the operation state of the transmission mechanism. The transmission mechanism includes a motor drive circuit and a mechanical unit composed of several gear sets mounted on the housing. The program processing unit activates the gear sets of the mechanical unit, whereby the panel is driven by the transmission mechanism. After the panel is extended out of the housing, the panel can be swung forward downward, backward upward, leftward or rightward.

23 Claims, 10 Drawing Sheets

DISPLAY OBSERVATION ANGLE OF WHICH IS MULTIDIRECTIONALLY ADJUSTABLE

BACKGROUND OF THE INVENTION

The present invention is related to a display the observation angle of which is multidirectionally adjustable. A panel control system cooperates with a transmission mechanism disposed in the housing to drive the panel to extend out of the housing or retract into the housing. After the display panel is extended out of the housing, the panel can be further swung leftward or rightward or forward downward or backward upward. Accordingly, the observation angle of the panel can be multidirectionally adjusted.

A conventional display panel is manually mounted on a supporting stand. For example, Taiwanese Patent No. 381803 discloses a measure for connecting a display panel on a supporting stand. The measure includes a display panel, a supporting unit, a mechanical rotary shaft unit and a stepping motor. The supporting unit provides a fixing position where the display panel is fixed. The rotary shaft is composed of a semispherical claw and a funnel-shaped bracket connected therewith. The rotary shaft is connected to back side of the display panel. The central bearing of the bracket is connected with the stepping motor. The stepping motor is mounted on the supporting unit to electrically drive the bracket to rotate. The semispherical claw is driven to rotate the tubular shaft so as to rotate the display panel and adjust observation angle thereof.

The above structure has some shortcomings as follows:
1. In use, normally, the supporting stand must be fixed at a fixed position in car, such as upper side of instrument board of the car. When not used, the display panel cannot be stored.
2. The above structure is complicated. In addition, in order to facilitate observation of the display panel, the display panel is supported at a certain height so that it will occupy much room. In the case that the supporting stand and the display panel are mounted on the upper side of instrument board of the car (inner side of windshield), a driver will be unable to fully see the right front side of the car.

In order to solve the above problem, a retractable and burglar proof display panel structure has been developed, which can be hidden when not used. For example, Taiwanese Patent No. 265920 discloses a retractable display panel structure including a case, slide blocks and main and subsidiary slide rails. The display panel is received in the case and via the slide blocks slidably mounted on the main and subsidiary slide rails. A power source, a reducing unit and a driving gear are drivingly disposed in the case to push the display panel out of the case and swing the display panel up or down.

The above retractable display panel still has a shortcoming as follows: The display panel can be only extended out of the case or retracted into the case. The observation angle of the above display panel cannot be multidirectionally adjusted as the above Patent No. 381803. Therefore, it is inconvenient for a user to clearly see the display panel.

According to the above, the conventional display structures fail to have both functions of multidirectional adjustment of observation angle and storage of the display panel when not used.

SUMMARY OF THE INVENTION

It is therefore a primary object of the present invention to provide a display the observation angle of which is multidirectionally adjustable. The display includes a panel control system, a panel, a transmission mechanism and a housing for receiving the above components. The panel control system includes a program processing unit for turning on/off the transmission mechanism, a command input unit for giving control signal to the program processing unit and a mechanical position detection unit for always sensing the operation state of the transmission mechanism. The transmission mechanism includes a motor drive circuit and a mechanical unit composed of several gear sets mounted on the housing. Under control of the program processing unit, the motor drive circuit drives the gear sets of the mechanical unit, whereby the panel can be extended out of the housing or retracted into the housing. After extended out of the housing, the panel can be turned leftward or rightward. Therefore, it is no more necessary to manually bias the supporting stand of the display as in the conventional display. Also, the observation angle of the retractable display is no more limited to one-way adjustment as in the conventional display.

It is a further object of the present invention to provide the above display in which each gear set is directly or indirectly controlled and driven by at least one motor to drivingly operate multiple gears. One gear set is engaged with a gear disposed in the panel, whereby under control the drive circuit, the display panel can be extended out of the housing and then swung forward downward or backward upward. At least two gear sets are respectively movably engaged with a transmission guide member disposed on the housing. Under control of the drive circuit, the panel can be turned upward or downward.

It is still a further object of the present invention to provide the above display in which the housing is composed of an upper casing and a lower casing. The panel control system is received in a receiving space of the upper casing. The upper casing is mounted on an open side of the lower casing. The upper and lower casings define a layout space in which the panel and the transmission mechanism are movably received.

It is still a further object of the present invention to provide the above display in which the mechanical position detection unit of the panel control system includes multiple sensing cells which are respectively disposed between the gear sets. The sensing cells serve to always detect the position and state of the gear sets and relevant components and via a circuit unit send the signal to the program processing unit to provide true position of the panel.

It is still a further object of the present invention to provide the above display in which a power supply is disposed in the housing for providing power to the above components and circuits.

The present invention can be best understood through the following description and accompanying drawings wherein:

DETAILED DESCRIPTION OF THE PREFERRED EMBODIMENT

Figure 1:
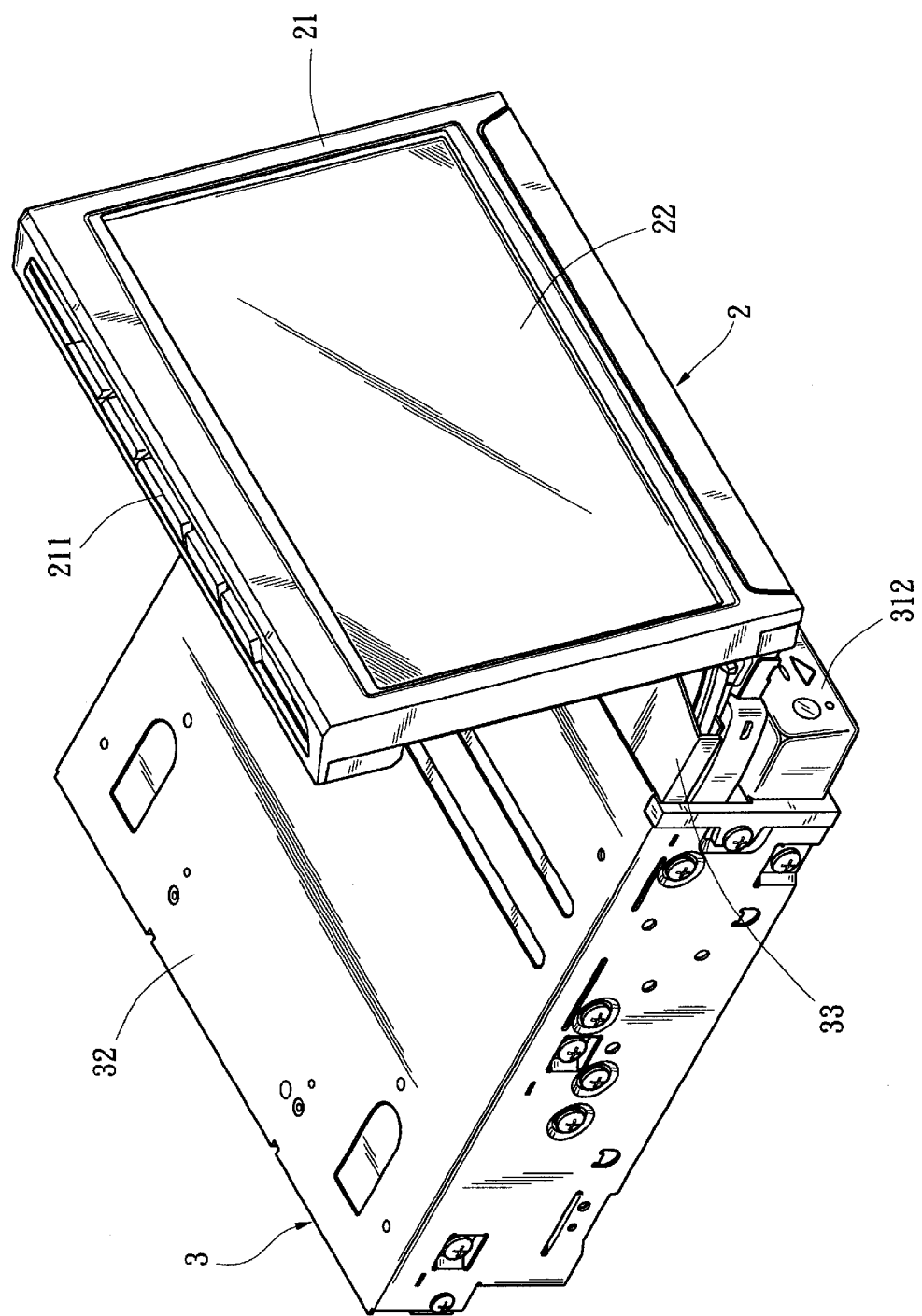
FIG. 1 is a perspective assembled view of the present invention, showing that the display panel is extended out of the housing.
Figure 2:
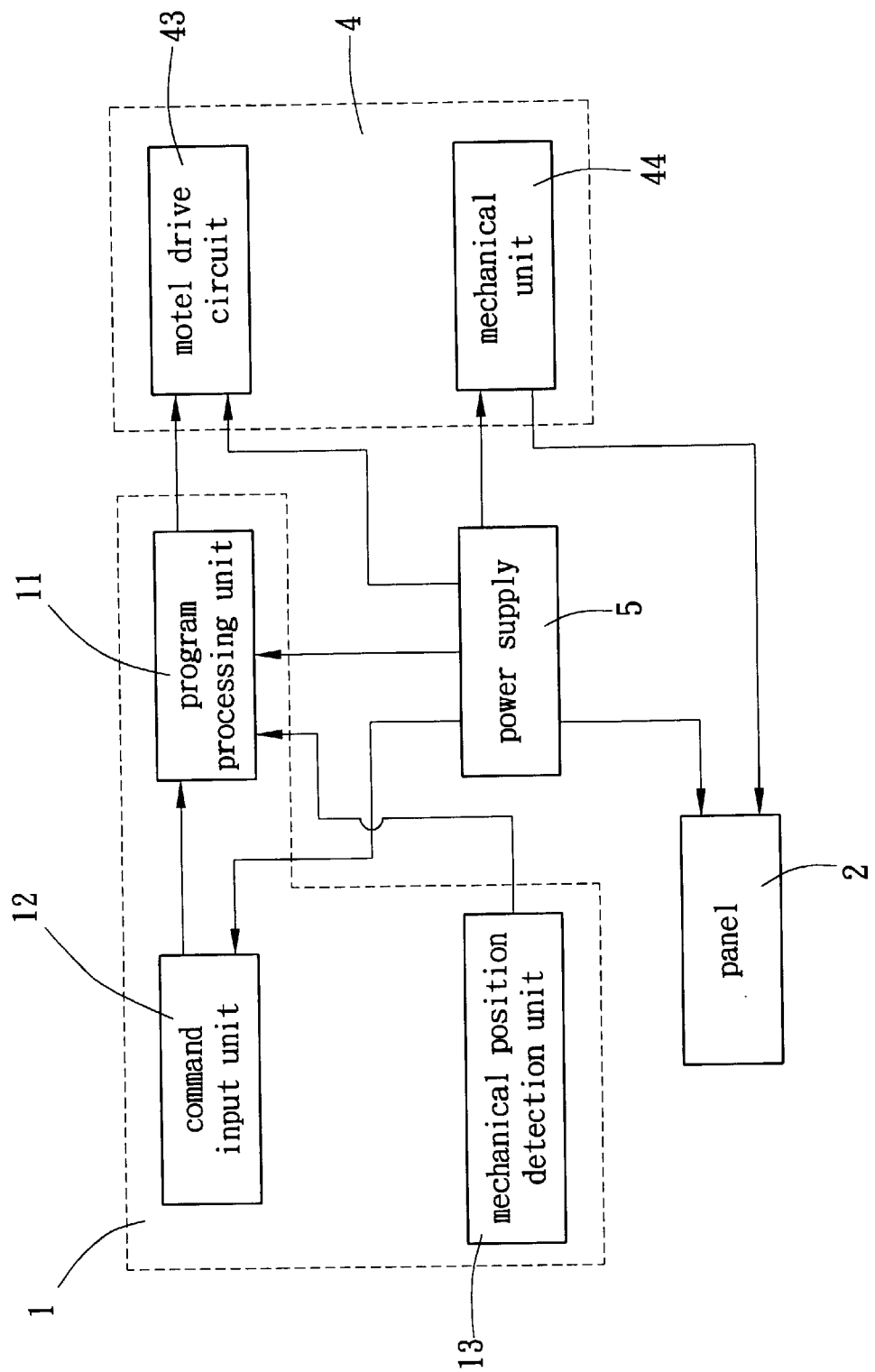
FIG. 2 is a block circuit diagram of the present invention.
Figure 3:
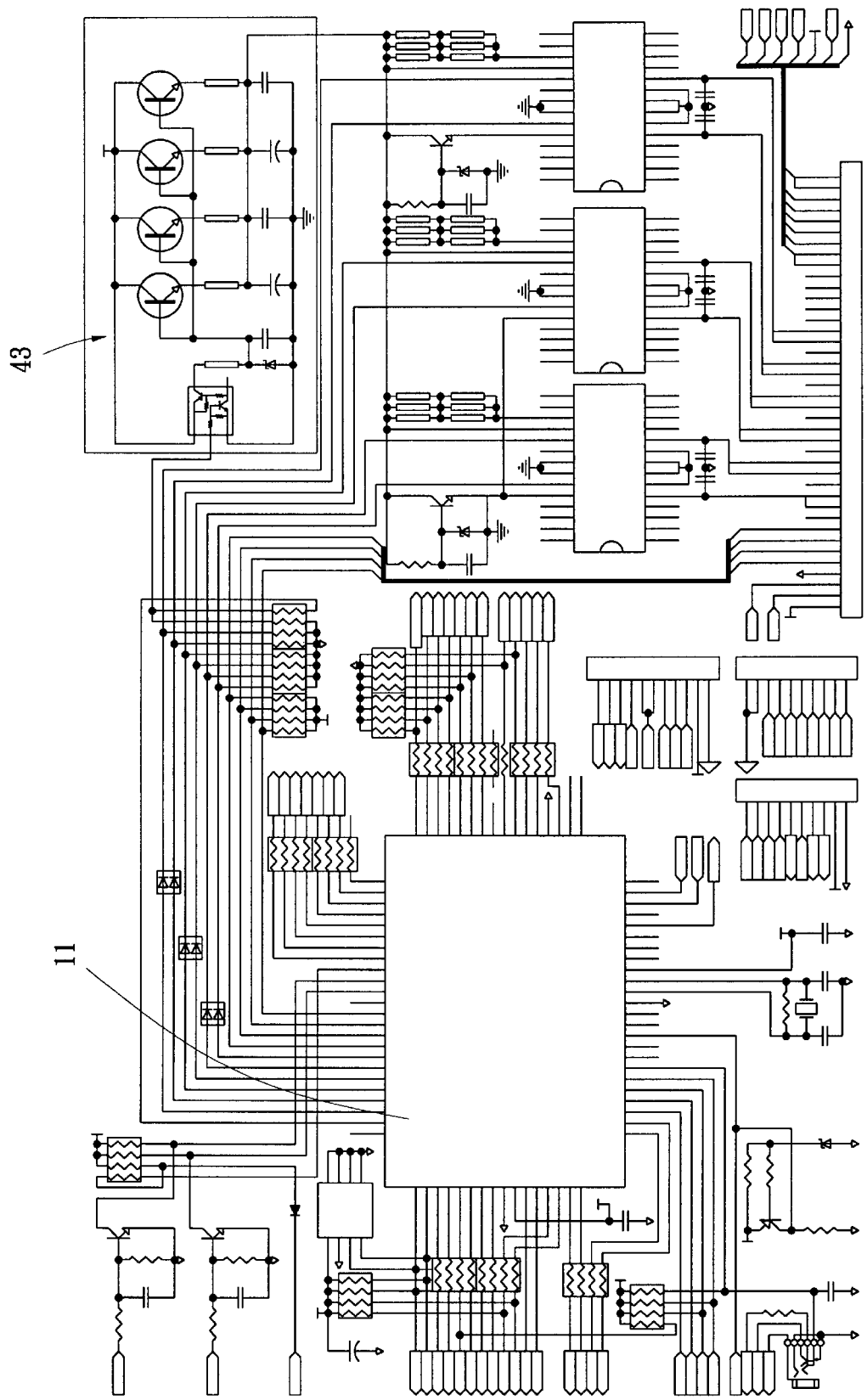
FIG. 3 is a circuit diagram of the present invention.

Please refer to FIGS. 1, 2 and 3. The present invention includes a panel control system 1, a panel 2, a housing 3 for receiving the respective components and a transmission mechanism 4 connected with the panel 2.

Figure 4:
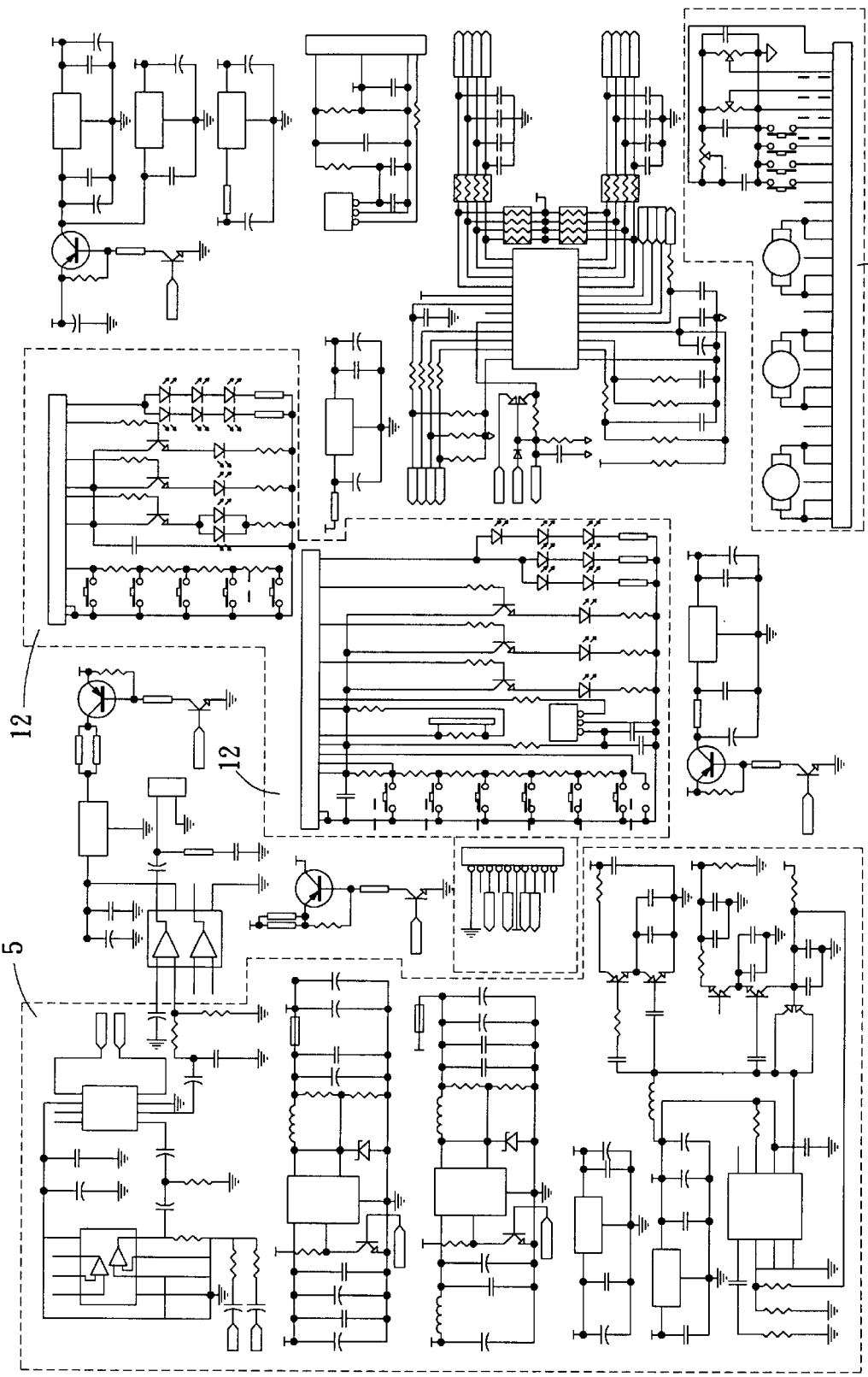
FIG. 4 is another circuit diagram of the present invention.
Figure 5:
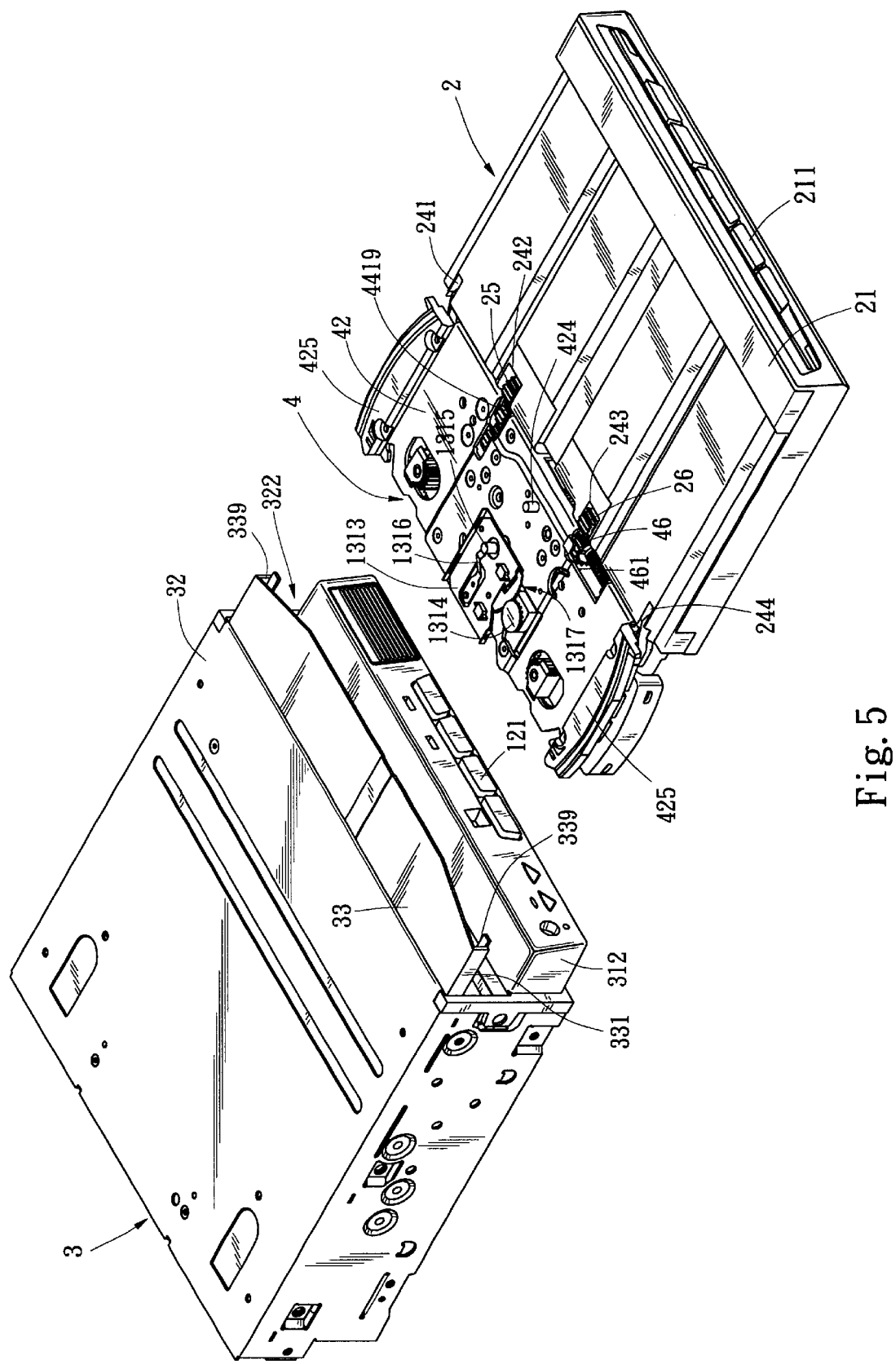
FIG. 5 is a perspective exploded view of a part of the present invention.
Figure 7:
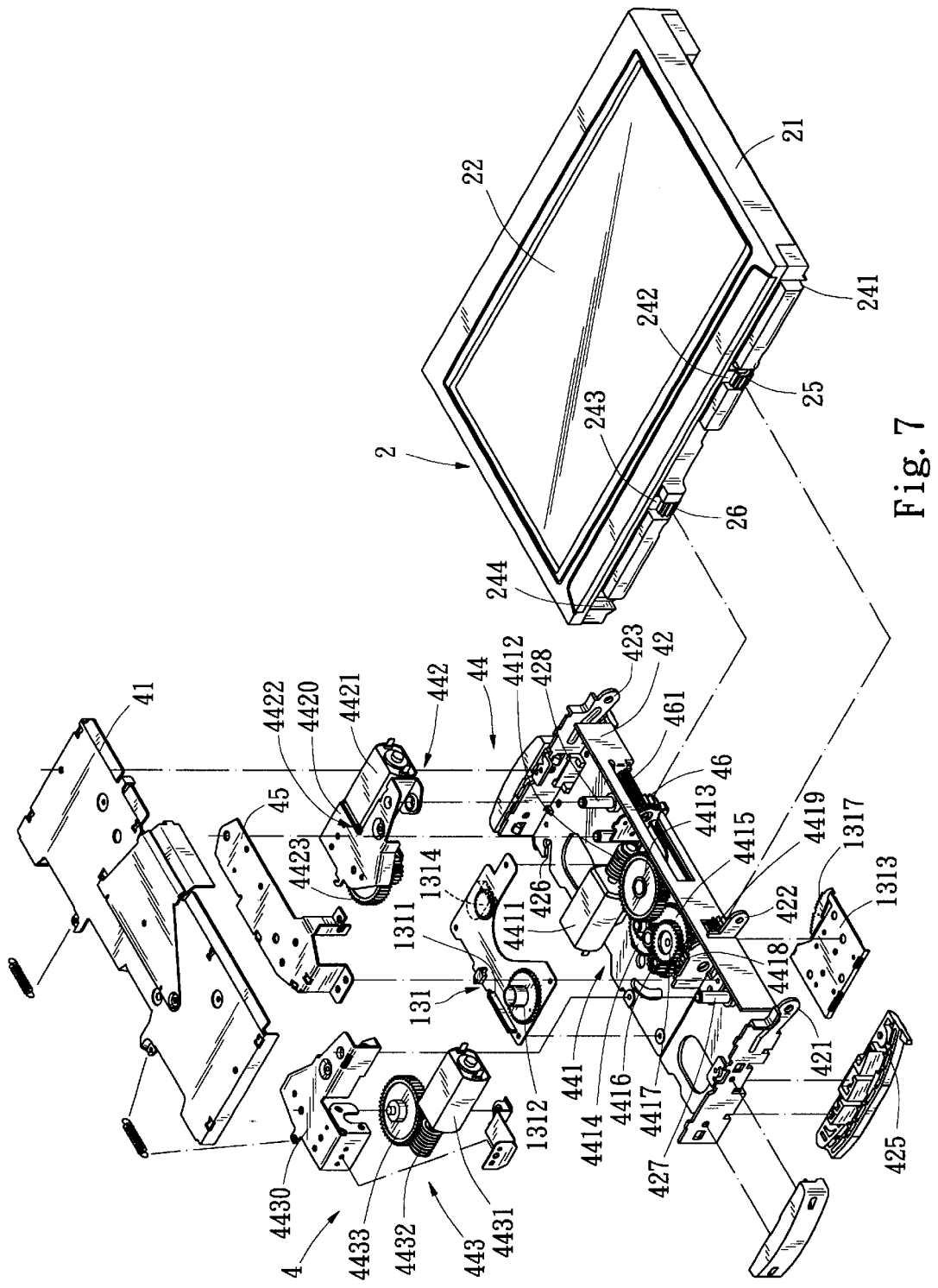
FIG. 7 is a perspective view of the display panel, transmission mechanism and housing of the present invention.

Please refer to FIGS. 2, 3 and 4. The panel control system 1 includes a program processing unit 11 for turning on/off the transmission mechanism 4, a command input unit 12 for giving control signal to the program processing unit 11 and a mechanical position detection unit 13 for always sensing the operation state of the transmission mechanism 4. The program processing unit 11 is a circuit composed of processing chip and several electronic elements. The program processing unit 11 stores therein various set modes for activating the transmission mechanism 4 to operate. After a user via the command input unit 12 selects an operation command, the program processing unit 11 will according to the selected command take out the corresponding operation mode and send the signal to the transmission mechanism 4 and make the same operate. Referring to FIG. 5 or 7, the mechanical position detection unit 13 is composed of several sensing cells 131 respectively disposed between the gear sets or in the moving paths of the components of the transmission mechanism 4. The sensing cells 131 serve to always detect the operation state of the gear sets or relevant components and convert the operation state into signal for the program processing unit 11 to receive so as to further adjust the operation state. Also, in case any component fails to truly restore to its home position, the component can be emergently stopped from operating.

Figure 6:
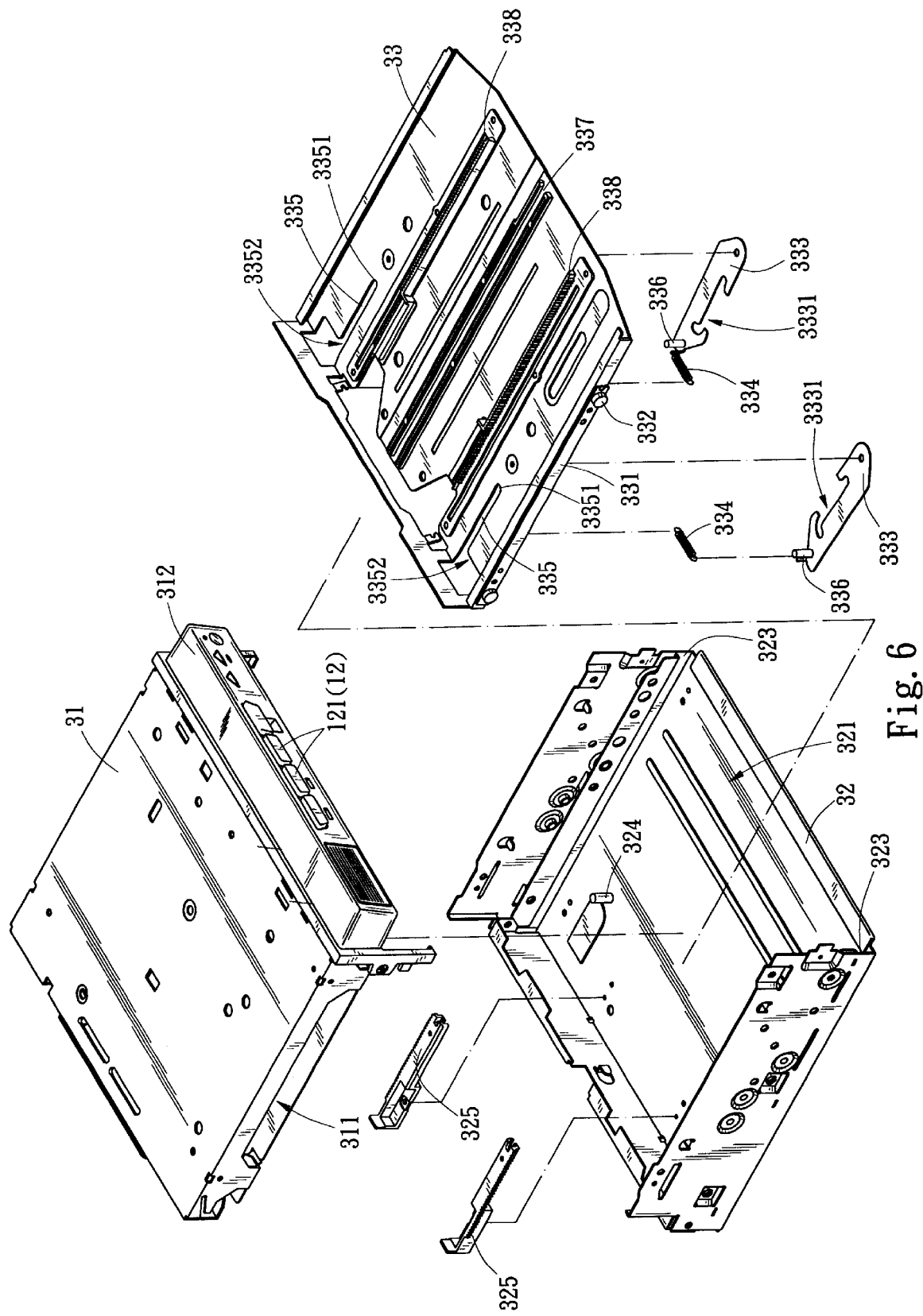
FIG. 6 is a perspective exploded view of the housing of the present invention.

Referring to FIGS. 5 and 6, the housing 3 is composed of an upper casing 31 and a lower casing 32. The upper casing 11 is a case defining therein a receiving space 311 in which the program processing unit 11 is disposed. A control panel 312 is disposed at one end of the receiving space 311. On the control panel 312 are disposed a command input unit 12 composed of multiple press keys 121. (The command input unit 12 can be used in cooperation with a remote controller.) The command input unit 12 is connected with the program processing unit 11 for a user to touch and control the functions of the panel 2. The upper casing 31 is mounted on an upper open side of the lower casing 32. The upper and lower casings 31, 32 define therebetween a layout space 321. The lower casing 31 is formed with a slot 322 on the same side as the control panel 312 of the upper casing 31. The layout space 321 provides an area permitting the panel 2 and the transmission mechanism 4 to move outward or inward through the slot 322.

A base board 33 is disposed on the lower casing 32. Two sides of the base board 33 are formed with ribs 331 on which slide blocks 332 are disposed. Two sides of the lower casing 32 are formed with slide channels 323 corresponding to the slide blocks 332 for guiding the same. The slide blocks 332 are movable within the slide channels 323, whereby the base board 33 can slide along the slide channels 323. Two opposite hook bodies 333 are pivotally disposed on lower side of base board 33 and pulled by resilient members 334 to keep in an inward biased state. The inner side of each hook body 333 is formed with a restricting guide notch 3331. The base board 33 is formed with guide slots 335 corresponding to and overlapping the guide notches 3331. Each guide slot 335 has a close end 3351 and an open end 3352. The lower casing 32 is formed with locating posts 324 respectively corresponding to the sliding positions of the guide notches 3331 and guide slots 335.

Figure 8:
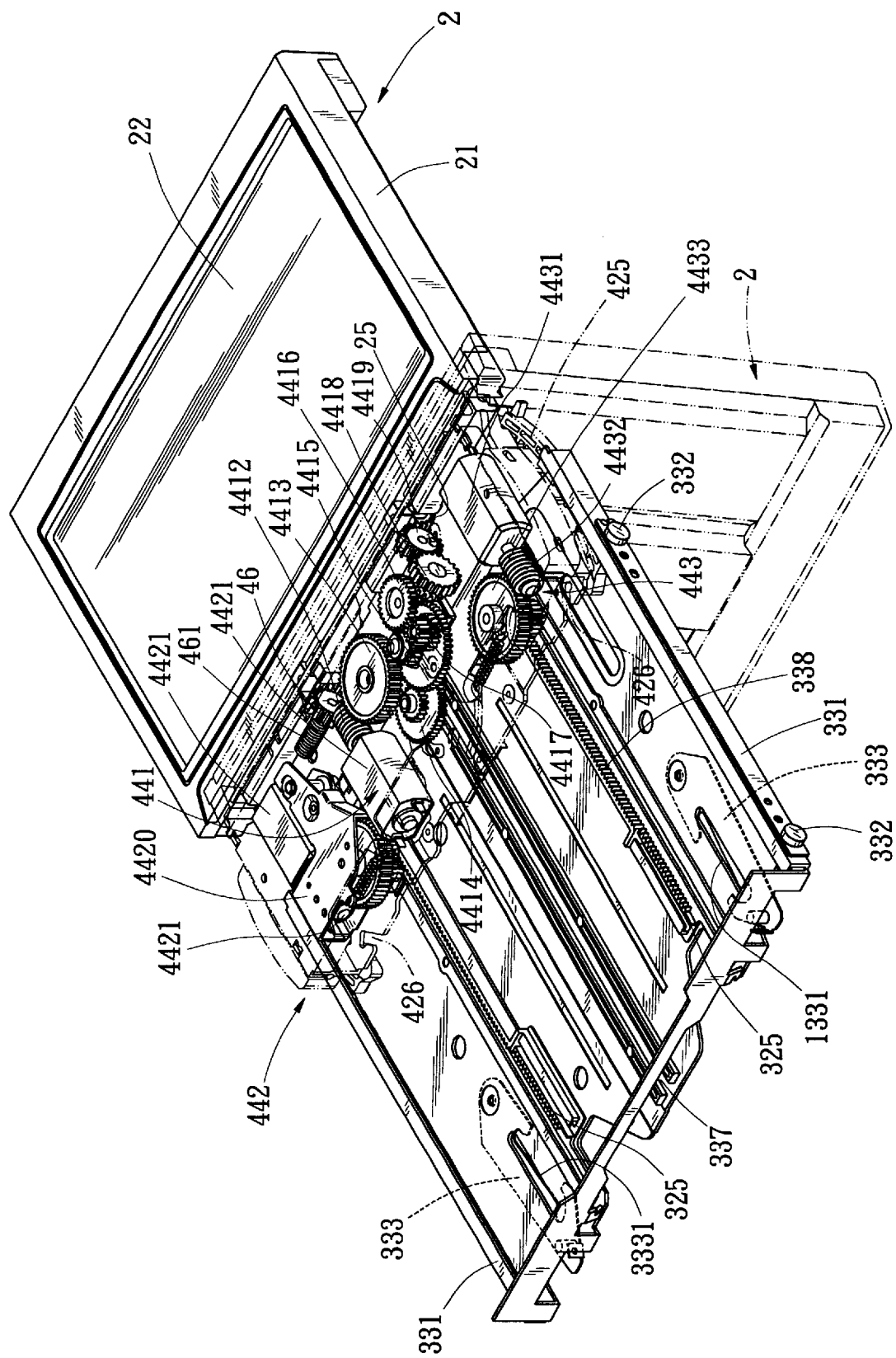
FIG. 8 shows that the panel of the present invention is extended out of the housing.

Referring to FIGS. 6 and 8, when the base board 33 is slided and retracted into the housing 3, the close ends 3351 of the guide slots 335 abut against the locating posts 324 to restrict the base board 33. Reversely, when the base board 33 is slided outward from the housing 1 and the open ends 3352 are moved to get close to the locating posts 324, the guide notches 3331 of the hook bodies 333 instantaneously hook and locate the locating posts 324. Each hook body 333 has a press post 336. By means of shifting the press posts 336 in a direction reverse to the hooking direction, the locating posts 324 are released from the hooking of the hook bodies 333.

The middle of top face of the base board 33 is provided with a guide channel 337. Two opposite racks 338 are parallelly disposed on two sides of the guide channel 337. Two opposite racks 325 are disposed on the lower casing 32 corresponding to the two racks 338. The racks 325 can extend out from the base board 33 and overlap the racks 338 to cooperatively extend the travel.

Referring to FIGS. 1 and 5, the panel 2 is composed of a frame body 21 and a liquid crystal display unit 22 disposed at the center of the frame body 21. The top of the panel 2 is provided with multiple press keys 211 cooperating with the press keys 121 of the control panel 312 to form the command input unit 12 for a user to touch and control the extension/retraction and other functions of the panel 2. The bottom of the panel 2 is formed with four sets of pivot holes 241, 242, 243, 244. The transmission mechanism 4 is pivotally connected at the pivot holes 242 and 243. Gears 25, 26 are mounted at the pivot holes 242, 243.

Referring to FIG. 7, the transmission mechanism 4 is disposed in a space defined between an upper and a lower casings 41, 42. One side of the lower casing 42 is provided with lugs 421, 422, 423 corresponding to the pivot holes 241, 242, 244. The lugs 421, 422, 423 are respectively pivotally mounted in the pivot holes 241, 242, 244, whereby the panel 2 is pivotally connected with the transmission mechanism 4.

Referring to FIGS. 2 and 3, the transmission mechanism 4 includes a motor drive circuit 43 and a cooperative mechanical unit 44 composed of a first gear set 441, a second gear set 442 and a third gear set 443 disposed on the lower casing 312. The motor drive circuit 43 receives the signal sent from the program processing unit 11 to drive the gear sets 441, 442, 443 of the mechanical unit 44. The first gear set 44 is arranged in a space defined by a shell plate 45 and the lower casing 42. The first gear set 441 includes a power source 4411 such as a motor, a spiral gear 4412, a main gear 4413, a subsidiary gear 4414, a driven gear 4415, a first driven gear 4416, a bevel gear 4417, a second driven gear 4418 and a third driven gear 4419. The spiral gear 4412 is fitted on the power source 4411. The power generated by the power source 4411 is transmitted to sequentially drive the main gear 4413, the subsidiary gear 4414, the driven gear 4415, the first driven gear 4416, the bevel gear 4417, the second driven gear 4418 and the third driven gear 4419. The third driven gear 4419 extends out of the lower casing 42 to engage with the gear 25 of the panel 2. By means of the power source 4411, the third driven gear 4419 is able to drive the gear 25 of the panel 2 to clockwise or counter-clockwise rotate. (That is, the panel 2 is driven to swing forward downward or swing backward upward.)

Referring to FIGS. 5 and 7, a sensing unit 131 is disposed in a position near the first gear set 441. The sensing unit 131 includes multiple circuit elements 1311, a first sensory gear 1312, a movable plate 1313 and a second sensory gear 1314. The movable plate 1313 is mounted on back face of the lower casing 42 near the center thereof. The first sensory gear 1312 is engaged with the driven gear 4215 for sending the rotational signal of the driven gear 4215 to the circuit elements 1311 for the program processing unit 11 to take the data of rotational angle. The movable plate 1313 is provided with a projecting post 1315, a leaf spring 1316 and a toothed edge 1317 for meshing with the second sensory gear 1314.

When the movable plate 1313 is swung, the second sensory gear 1314 detects the movement of the toothed edge 1317 and via the circuit elements 1311 sends the signal to the program processing unit 11. The projecting post 1315 and the leaf spring 1316 are correspondingly slidably inlaid in the guide channel 337 of the base board 33. A projecting post 424 is disposed on the lower casing 42 longitudinally corresponding to the projecting post 1315 and slidably inlaid in the guide channel 337 of the base board 33. Two sides of the lower casing 42 and the base board 33 are respectively formed with corresponding slide blocks 425 and channels 339. The slide blocks 425 of the lower casing 42 are slidably inlaid in the channels 339 of the base board 33 to serve as guide rails. The second gear set 442 and third gear set 443 are movably engaged with the rack 338 of the base board 33 and the rack 325 of the lower casing 32.

Referring to FIG. 7, the lower casing 42 is provided with a back gear 46 corresponding to the gear 26 of the panel 2. The back gear 46 meshes with the gear 26 and is resiliently forced by a resilient body 461. After the panel 2 extends out of the housing 1, the back gear 46 makes the panel 2 naturally upward swing to reduce the load on the power source 4411 for upward swinging the panel 2.

Referring to FIG. 7, the second gear set 442 and third gear set 443 are respectively mounted on two movable shell seats 4420, 4430. The second gear set 442 and third gear set 443 respectively include power sources 4421, 4431, spiral gears 4422, 4432 and driving gears 4423, 4433. The movable shell seats 4420, 4430 are respectively disposed on two sides of the first gear set 441. Shaft members 427, 428 are disposed on the lower casing 42 for pivotally connecting the movable shell seats 4420, 4430 with the lower casing 42. The power sources 4421, 4431 via the spiral gears 4422, 4432 mounted thereon drive the driving gears 4423, 4433 to rotate. The driving gears 4423, 4433 downward extend out of the lower casing 42 to mesh with the rack 338 of the base board 33 and the rack 125 of the lower casing 12. Under control of the program processing unit 11, the second gear set 442 and third gear set 443 can synchronously rotate. When driven by the power sources 4421, 4431 of the two gear sets 442, 443, the driving gears 4423, 4433 can forward or backward rotate.

Figure 9:
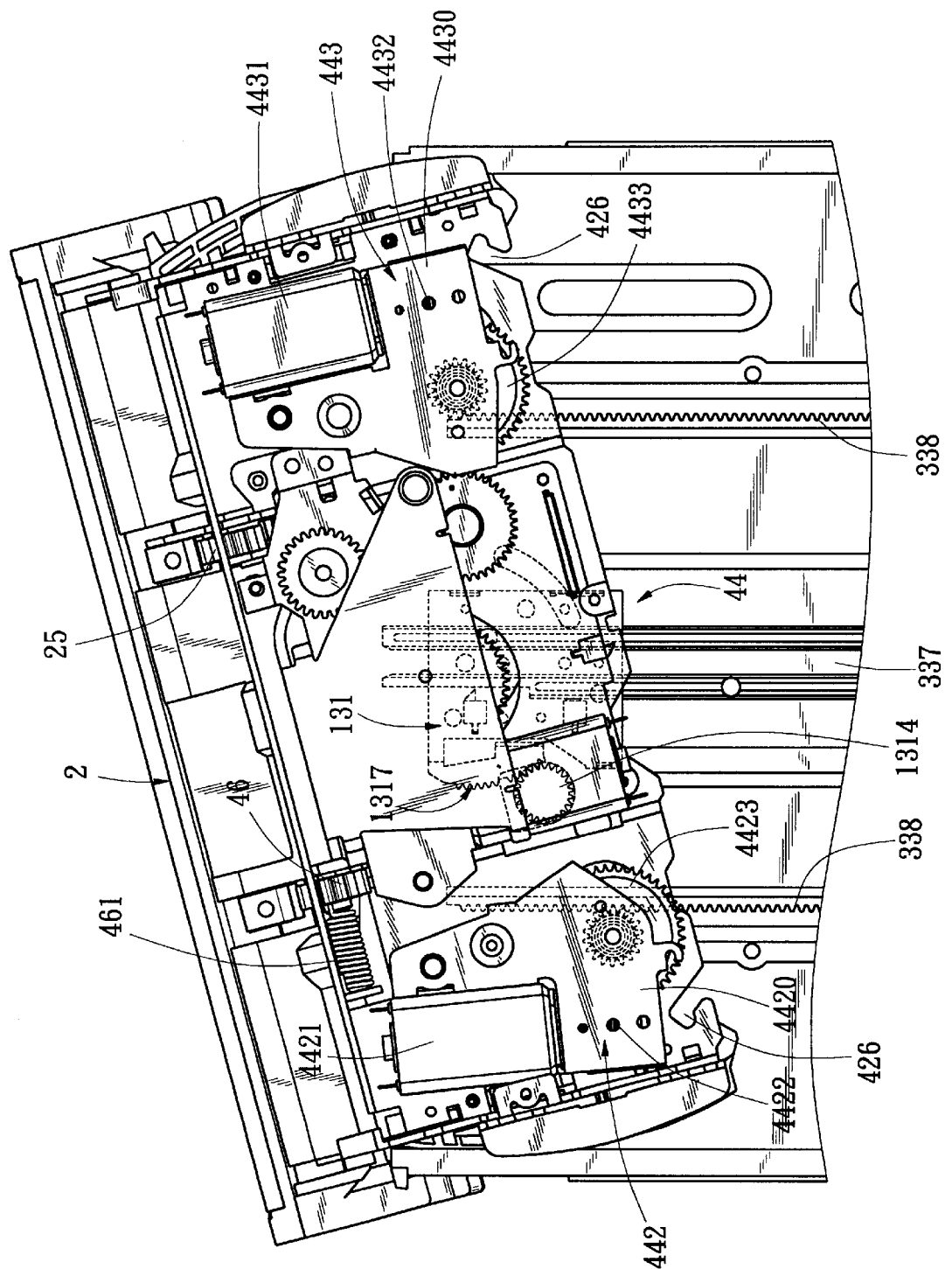
FIG. 9 shows that the panel of the present invention is turned leftward.
Figure 10:
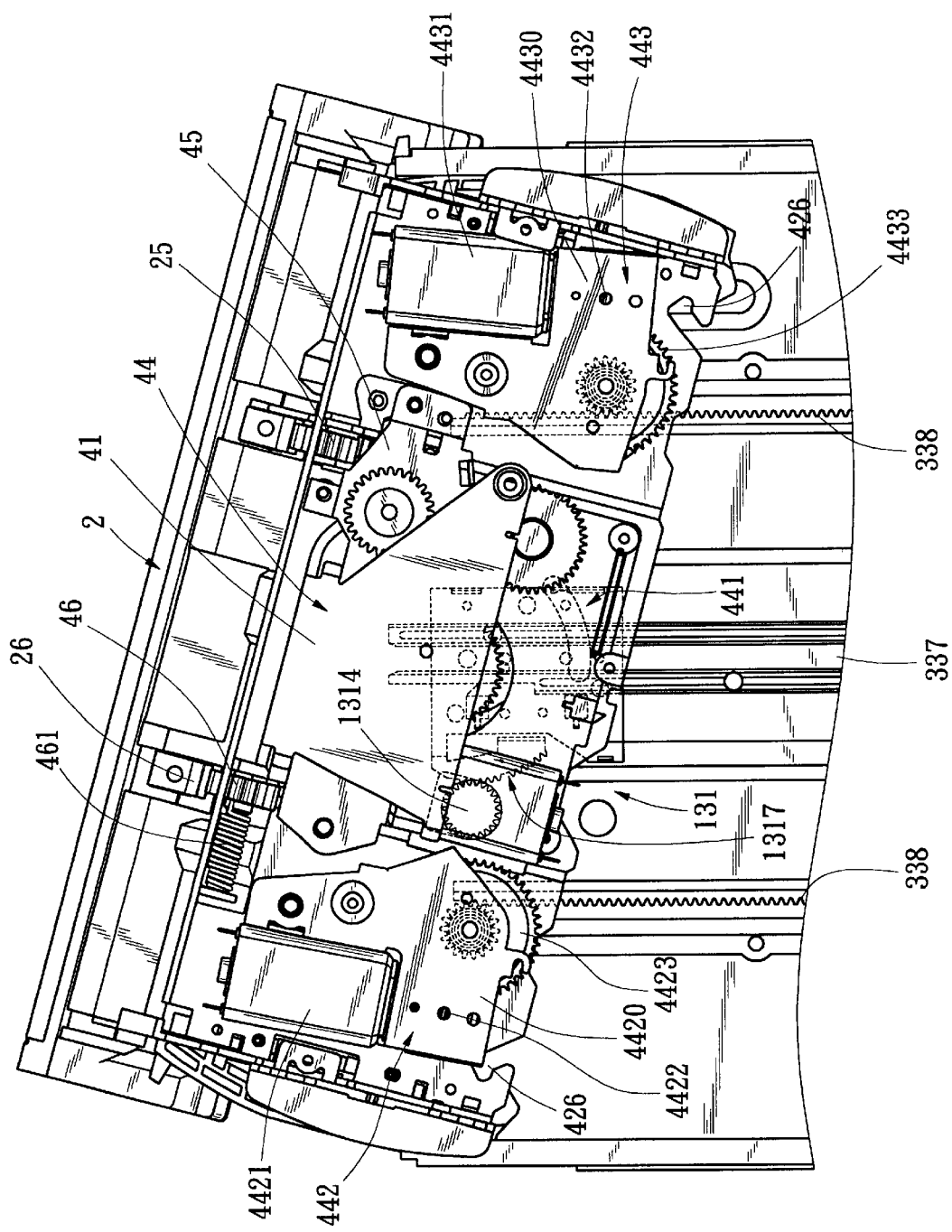
FIG. 10 shows that the panel of the present invention is turned rightward.

Referring to FIGS. 8, 9 and 10, after powered on, in the case that it is desired to extend the entire panel 2 out of the housing 1, an operator can select corresponding press keys 121, 211 of the command input unit 12 and the program processing unit 11 sends the command to the motor drive circuit 43 to control the power sources 4421, 4431 of the two gear sets 442, 443 to simultaneously respectively forward and backward rotate. At this time, the driving gears 4423, 4433 are driven to continuously move outward along the rack 338 of the base board 33. At this time, a hooking notch 426 of the lower casing 42 hooks the press post 336 and the base board 33 is together driven to move outward. When the open end 3352 of the base board 33 moves to a position close to the locating post 324, the guide notch 3331 of the hook body 333 instantaneously hooks and locates the locating post 324, whereby the base board 33 no more slides forward. The lower casing 42 continuously drives the panel 2 to move outward until the panel 2 entirely extends out of the housing 3. Thereafter, the back gear 46 on the lower casing 42 resiliently makes the panel 2 naturally upward swing.

After the panel 2 extends out of the housing 3, the program processing unit 11 according to the selected operation mode controls the power source 4421, 4431 of the second or third gear set 442, 443 to operate.

When swinging the panel 2 leftward, the power source 4421 of the second gear set 442 is backward rotated and the power source 4431 of the third gear set 443 is forward rotated to complete the operation. Reversely, when swinging the panel 2 rightward, the power source 4421 of the second gear set 442 is forward rotated and the power source 4431 of the third gear set 443 is backward rotated to complete the operation.

When the second gear set 442 and third gear set 443 are swung leftward or rightward, the movable plate 1313 under the lower casing 42 is synchronously swung. The swinging signal is detected by the second sensory gear 1314 and sent to the program processing unit 11. It should be noted that prior to each time of operation of the panel 2, the mechanical position detection unit 13 always detects the states of respective parts of the transmission mechanism 4 such as the gear sets 441, 442, 443 of the mechanical unit 44. The states are converted into signals to be received by the program processing unit 11 so as to further adjust the operation states of the gear sets or emergently stop the gear sets from operating or emit a failure signal.

Referring to FIG. 4, a power supply 5 is disposed in the housing 3 for providing power necessary for operation of the panel control system 1, panel 2 and transmission mechanism 4.

The above embodiment is only used to illustrate the present invention, not intended to limit the scope thereof. Many modifications of the above embodiment can be made without departing from the spirit of the present invention.

What is claimed is:

1. A display with an observation angle that is multidirectionally adjustable, the display comprising:
   a) a housing having a layout space;
   b) a panel having a display unit;
   c) a transmission mechanism pivotally connected to at least one side of the panel and having a plurality of gear sets, the panel and transmission mechanism being slidably located in the layout space of the housing, the plurality of gear sets includes:
      i) at least one gear set selectively moving the panel between a retracted position within the housing and an extended position extending from the housing;
      ii) when the panel is in the extended position, at least one gear set selectively pivoting the panel with respect to the transmission mechanism around an axis parallel with the pivotal connection between the panel and the transmission mechanism; and
      iii) when the panel is in the extended position, at least one gear set selectively pivoting the panel with respect to the housing around an axis perpendicular to the pivotal connection between the panel and the transmission mechanism; and d) a panel control system having:
  i) a program processing unit storing a plurality of set modes for activating operations of the transmission mechanism and controlling the transmission mechanism;
  ii) a command input unit providing control signals to the program processing unit; and
  iii) a mechanical position detecting unit electrically connected to the program processing unit and sensing the operation state of the transmission mechanism.

2. The display according to claim 1, wherein the program processing unit is a circuit including a processing chip and several electronic elements.

3. The display according to claim 1, wherein the mechanical position detection unit includes a plurality of sensing cells respectively located on the transmission mechanism and the housing, detecting the operation state of the plurality of gear sets and components of the transmission mechanism and sending signals to the program processing unit.

4. The display according to claim 1, wherein the housing includes an upper casing and a lower casing, the upper casing being formed with a receiving space in which the panel control system is located, the upper and lower casings defining the layout space in which the display panel and a transmission mechanism are movably received, a base board being slidably located on the lower casing, a rack and guide channel located on the base board for guiding the transmission mechanism.

5. The display according to claim 4, wherein a control panel is located at one end of the receiving space, the control panel includes a command input unit having a plurality of press keys for a user to touch and control the functions of the panel.

6. The display according to claim 4, wherein each of the two sides of the base board are formed with ribs having slide blocks, two sides of the lower casing being formed with slide channels corresponding to the slide blocks, the slide blocks being movable within the slide channels, whereby the base board slides along the slide channels.

7. The display according to claim 4, wherein two opposite hook bodies are pivotally located on a lower side of the base board and pulled by resilient members to keep the hook bodies in an inward biased state, an inner side of each hook body having a guide notch, the base board having guide slots corresponding to and overlapping the guide notch of each hook body, each guide slot having a close end and an open end, the lower casing having locating posts respectively corresponding to sliding positions of the guide notches and guide slots, wherein, when the base board is retracted into the housing the close ends of the guide slots abut against the locating posts to restrict the base board, and reversely, when the base board is extended from the housing, the locating posts are within the open ends of the guide slots, and the guide notches of the hook bodies hook the locating posts.

8. The display according to claim 4, wherein two lower racks are located on the lower casing corresponding to the two racks of the base board, whereby the lower racks of the lower casing extend from the base board and overlap the racks thereof to cooperatively extend a range of travel.

9. The display according to claim 5, wherein a top side of the panel has a plurality of panel press keys which cooperate with the plurality of press keys of the control panel.

10. The display according to claim 4, wherein each hook body has a press post, when the base board is moved toward a retracted position, the locating posts are released from the hook bodies.

11. The display according to claim 1, wherein a bottom of the display panel unit has a plurality of pivot holes, a panel gear mounted in at least one of the plurality of pivot holes for meshing with the transmission mechanism.

12. The display according to claim 11, wherein the transmission mechanism is located in a space defined by an upper casing and a lower casing, one side of a transmission lower casing of the transmission mechanism being provided with lugs corresponding to the pivot holes of the display panel, the lugs being pivotally mounted in the pivot holes.

13. The display according to claim 12, wherein two sides of the lower casing and the base board are respectively formed with corresponding slide blocks and channels, the slide blocks of the lower casing being slidably inserted into the channels of the base board to serve as guide rails, two of the plurality of gear sets mesh with the rack of the base board and the rack of the lower casing.

14. The display according to claim 11, wherein the transmission mechanism includes a transmission lower casing having a back gear meshing with the panel gear of the panel and being resiliently forced by a resilient body to pivot the panel upwardly when the panel is in the extended position.

15. The display according to claim 13, wherein the transmission mechanism includes a transmission lower casing having a back gear meshing with the panel gear of the panel and being resiliently forced by a resilient body to pivot the panel upwardly when the panel is in the extended position.

16. The display according to claim 10, wherein a hooking notch is formed on the transmission lower casing, whereby when the transmission lower casing is moved out of the housing, the hooking notch hooks the press post of the hook body so that the base board moves outwardly.

17. The display according to claim 4, wherein the transmission mechanism includes a mechanical unit having first, second and third gear sets located on a transmission lower casing and a motor drive circuit receiving signals from the panel control system to control the respective gear sets.

18. The display according to claim 17, wherein the second gear set is located on a movable shell seat and includes a power source, a spiral gear and a driving gear mounted on the movable shell seat, a shaft member protruding from the transmission lower casing, the movable shell seat is pivotally inserted on the shaft member.

19. The display according to claim 18, wherein the driving gear of the second gear set extends downwardly out of the transmission lower casing to mesh with the rack of the base board and a rack of the lower casing, the driving gear being driven by the power source to rotate along the racks so as to extend the display panel out of the housing and retract the display panel into the layout space of the housing.

20. The display according to claim 17, wherein the third gear set is located on a movable shell seat and includes a power source, a spiral gear and a driving gear mounted on the movable shell seat, a shaft member protruding from the transmission lower casing, the movable shell seat is pivotally inserted on the shaft member.

21. The display according to claim 20, wherein the driving gear of the third gear set extends downwardly out of the transmission lower casing to mesh with the rack of the base board and a rack of the lower casing, the driving gear being driven by the power source to rotate along the racks so as to extend the display panel out of the housing and retract the display panel into the layout space of the housing.

22. The display according to claim 17, wherein the first gear set is located adjacent to a shell plate on the lower casing, the first gear set includes a power source, a spiral gear, a main gear, a subsidiary gear, a driven gear, a first driven gear, a bevel gear, a second driven gear and a third driven gear, the spiral gear located on the power source, power generated by the power source being transmitted to sequentially drive the main gear, the subsidiary gear, the driven gear, the first driven gear, the bevel gear, the second driven gear and the third driven gear, the third driven gear extending out of the lower casing to engage with a panel gear of the display panel.

23. The display according to claim 17, wherein a sensing unit is located adjacent to the first gear set, the sensing unit including multiple circuit elements, a first sensory gear, a movable plate and a second sensory gear, the movable plate being pivotally mounted on a rear of the transmission lower casing near a center thereof, the first sensory gear being engaged with the driven gear and sending the rotational signal of the driven gear to the circuit elements for the program processing unit to collect data of a rotational angle, the movable plate being provided with a plate projecting post, a leaf spring and a toothed edge for meshing with the second sensory gear, whereby when the movable plate pivots, the second sensory gear detects the movement of the toothed edge and the circuit elements send the signal to the program processing unit, the projecting post and the leaf spring being slidably inserted into the guide channel of the base board, a projecting post being located on the transmission lower casing longitudinally corresponding to the plate projecting post of the movable plate and slidably inserted into the guide channel of the base board.

* * * * *